March 9, 1943.  J. PERSOONS ET AL  2,313,260
CREAM SEPARATOR
Filed July 29, 1939
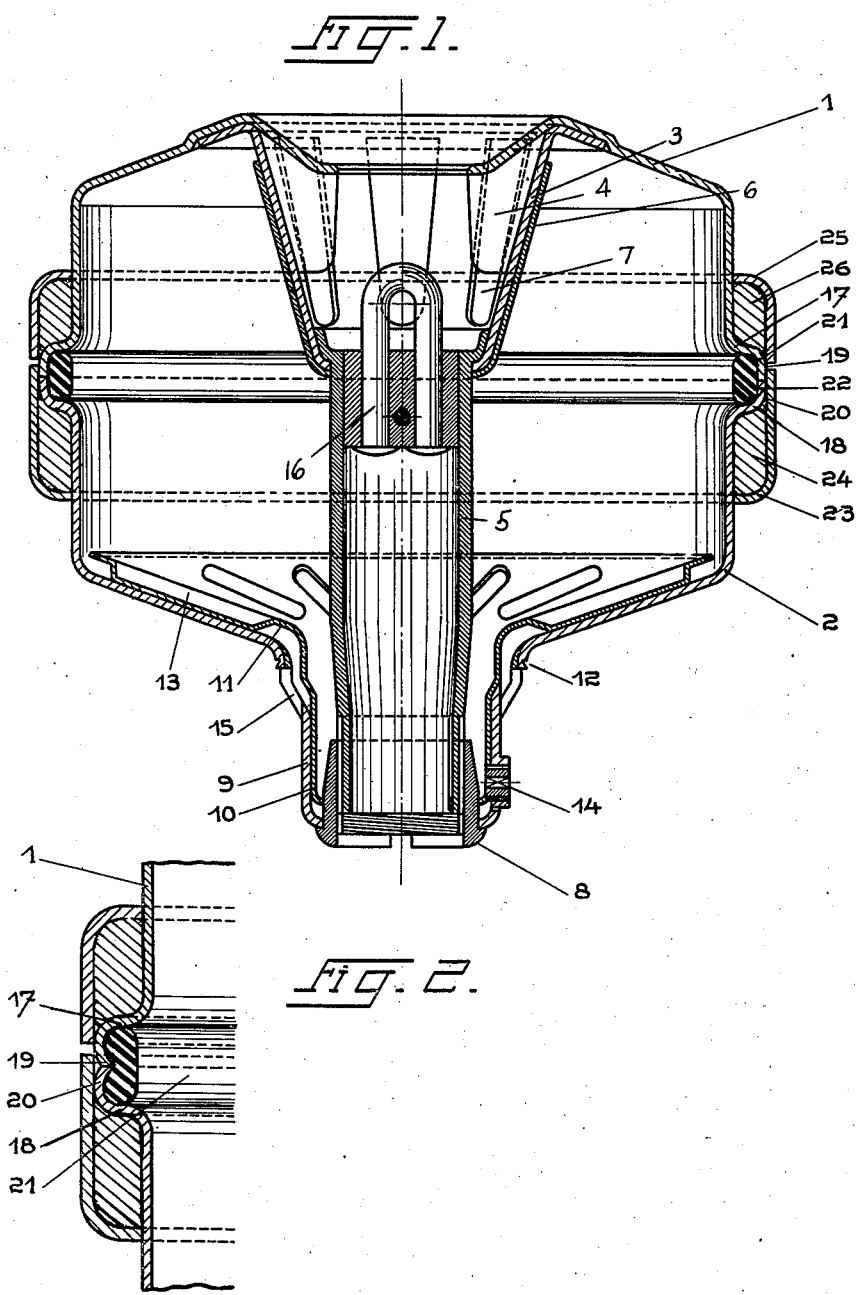
Jules Persoons
Alphonse Persoons
INVENTORS
By Otto Munk
their ATTY.

Patented Mar. 9, 1943

2,313,260

UNITED STATES PATENT OFFICE 2,313,260

CREAM SEPARATOR

Jules Persoons and Alphonse Persoons, Thildonck, Belguim; vested in the Alien Property Custodian Application July 29, 1939, Serial No. 287,300
In Belgium August 5, 1938

2 Claims. (Cl. 233—27)

Our invention relates to improvements in the centrifuges for cream separators or similar machines which are formed of two portions, for instance of sheet metal, an upper portion and a lower portion, each of the said portions being provided, where they meet, with cooperating outwardly flared rims forming an inwardly open annular groove in which is situated a joint or gasket which is applied against the wall by the centrifugal force. A separator of this type is described and claimed in our copending application Ser. No. 201,484.

The invention has for its object to provide means whereby it is possible to improve the tightness of the seal effected by the annular gasket. On the annexed drawing, Figures 1 and 2 show by way of examples two forms of embodiment of the present invention.

The centrifugal apparatus according to the invention, comprises a vessel which is formed of an upper portion, f. i. a cover 1, and a lower portion, f. i. a body 2. Both portions are preferably obtained by a stamping operation and are made for instance of stainless steel sheet iron.

A chamber 3 for the entry of the milk is provided with paddles 4 and at the bottom of this chamber is fixed by soldering a central tube 5 for instance of sheet iron which connects both portions 1 and 2.

Outside the space or chamber 3 is situated a conical sleeve 6 which permits of the passage of the milk from the chamber 3 into the centrifuge through the upper part of openings 7 formed in the chamber 3.

A nut 8 screws on to the lower threaded portion of the tube 5 and also into a chamber 9 in which is engaged a prolongation 10 of a false bottom 11. The chamber 9 is connected to the member 2 by insertion and force fitting as indicated at 12. The false bottom 11 is provided with projections 13 whereby the false bottom rests on the bottom of the centrifuge.

The reference number 14 indicates the exit channel for the cream, 15 indicates one of the openings for the discharge of the skimmed milk and 16 is the eyelet by which the centrifuge is suspended.

According to the invention, the upper portion or the cover 1 presents at its lower edge an outwardly flared rim portion 17 and the lower portion or body 2 is provided at its upper edge with an outwardly flared rim portion 18. The flared rim portions 17 and 18 terminate into substantially cylindrical rim portions 19, 20, respectively. The free edges of the cylindrical portions 19, 20 fit against one another to form an inwardly open annular groove or chamber of substantially trough-shaped cross-section with the axial height of the groove exceeding its radial depth. An elastic annular gasket 21, preferably of rubber, disposed in said annular groove, said gasket 21 being provided with a substantially flat surface 22 to be applied against the cylindrical rim portions 19 and 20.

The cylindrical portions 19—20 may be disposed exactly parallel to the axis of the centrifuge or they may be bent slightly inwardly, as shown in Figure 2.

In view of the presence of the cylindrical rim portions 19 and 20 and of the cooperation of the flat surface 22 of the gasket with the said portions 19—20, the gasket 22, which is pressed into the groove by the centrifugal force, contacts the walls adjacent the slit over a considerable area and a perfectly tight seal is obtained.

The body 2 may be provided with a fly wheel which is formed of an outer ring wall 23 surrounding the upper portion of the body at a uniform distance therefrom and forming a space filled by a mass 24 of a metal or of an alloy which is cheap and which can be easily worked.

The cover 1 can also be provided with a fly wheel formed in the same manner as the fly wheel of the body portion and comprising an outer wall 25 filled by a mass 26 in a metal which is cheap and which can be easily worked.

What we claim is:

1. In a cream separator, a sheet metal drum, comprising a body part having an outwardly flared upper rim portion terminating in a substantially cylindrical rim portion, and a cover part resting on and being secured to said body part, said cover part having an outwardly flared lower rim portion terminating in a substantially cylindrical rim portion, the free edges of said cylindrical rim portions fitting against one another to form with said flared rim portions an inwardly open annular groove of substantially trough-shaped cross-section, the substantially horizontal wall portions of said groove joining the vertical walls of said body portion and cover portion, respectively, along rounded peripheral edges, said groove having an axial height exceeding its radial depth and being provided with a split along its circumference, and an annular gasket of elastic material disposed in said groove and having a flat surface to be pressed against said cylindrical rim portions and said split by the centrifugal force when the separator is running.

2. In a cream separator, a sheet metal drum, comprising a body part having an outwardly flared upper rim portion terminating in a substantially cylindrical rim portion, and a cover part resting on and being secured to said body part, said cover part having an outwardly flared lower rim portion terminating in a substantially cylindrical rim portion, said cylindrical rim portions being bent slightly inwardly towards their free edges, said free edges fitting against one another to form with said flared rim portions an inwardly open annular groove of substantially trough-shaped cross-section, the substantially horizontal wall portions of said groove joining the vertical walls of said body portion and cover portion, respectively, along rounded peripheral edges, said groove having an axial height exceeding its radial depth and being provided with a circumferential split of a diameter slightly smaller than the greatest diameter of said groove, and an annular gasket of elastic material disposed in said groove and having a surface to be pressed against said cylindrical rim portions and said split by the centrifugal force when the separator is running.

JULES PERSOONS.
ALPHONSE PERSOONS.